(12) United States Patent
Strunk et al.

(10) Patent No.: US 12,335,580 B2
(45) Date of Patent: Jun. 17, 2025

(54) REAL-TIME STREAMING AND PLAYBACK OF DIGITAL MEDIA

(71) Applicant: Signiant Inc., Lexington, MA (US)

(72) Inventors: Jochen Strunk, Schöneck (DE); Robert Martin Krüger, Darmstadt (DE); Thomas Meyer, Berlin (DE)

(73) Assignee: Signiant Inc., Lexington, MA (US)

( * ) Notice: Subject to any disclaimer, the term of this patent is extended or adjusted under 35 U.S.C. 154(b) by 0 days.

(21) Appl. No.: 18/451,491

(22) Filed: Aug. 17, 2023

(65) Prior Publication Data

US 2025/0063233 A1  Feb. 20, 2025

(51) Int. Cl.
*H04N 21/6587* (2011.01)
*G11B 27/10* (2006.01)
*H04N 21/2343* (2011.01)
*H04N 21/239* (2011.01)

(52) U.S. Cl.
CPC ......... *H04N 21/6587* (2013.01); *G11B 27/10* (2013.01); *H04N 21/234309* (2013.01); *H04N 21/2393* (2013.01)

(58) Field of Classification Search
CPC ....... H04N 21/6587; H04N 21/234309; H04N 21/2393; G11B 27/10
See application file for complete search history.

(56) References Cited

U.S. PATENT DOCUMENTS

| | | | |
|---|---|---|---|
| 6,734,877 B1 | 5/2004 | Fumitaka | |
| 8,509,598 B1 | 8/2013 | Ohashi | |
| 8,849,101 B2 | 9/2014 | Rosser | |
| 9,020,326 B2 | 4/2015 | Gibbon | |
| 9,055,130 B1 | 6/2015 | Colwell | |
| 9,060,190 B2 | 6/2015 | Li | |
| 9,426,543 B1* | 8/2016 | Li | H04N 21/8586 |
| 2009/0249222 A1 | 10/2009 | Schmidt | |
| 2012/0063635 A1* | 3/2012 | Matsushita | G06T 1/0028 382/100 |
| 2014/0380376 A1* | 12/2014 | Schmidt | H04N 21/4385 725/54 |
| 2016/0227258 A1 | 8/2016 | Zhang | |
| 2016/0234504 A1* | 8/2016 | Good | H04N 19/146 |
| 2019/0069006 A1* | 2/2019 | Rachabathuni | H04N 21/47217 |
| 2020/0404036 A1* | 12/2020 | Cain | H04N 21/8456 |
| 2021/0109966 A1* | 4/2021 | Ayush | G06N 3/044 |

* cited by examiner

*Primary Examiner* — Farzana Hossain
(74) *Attorney, Agent, or Firm* — Sheppard Mullin Richter & Hampton LLP

(57) ABSTRACT

The present technology provides systems and methods to facilitate seek functionality in real-time streaming and playback of digital media. In particular, the present technology provides for generating an index for a digital media file encoded in a non-streaming format, determining a portion of the digital media file to transcode, and transcoding the portion of the digital media file to a proxy format based on the index.

17 Claims, 7 Drawing Sheets

REAL-TIME STREAMING AND PLAYBACK OF DIGITAL MEDIA

FIELD OF INVENTION

The present technology relates to digital media. More particularly, the present technology relates to real-time streaming, including efficient seek operations, of digital media encoded in formats that do not natively support such operations.

BACKGROUND

Advances in digital media technologies have introduced various digital media formats. For example, MP4 is a commonly used digital multimedia container format that stores video and audio. The International Organization for Standardization/International Electrotechnical Commission (ISO/IEC) standardized the MP4 format with the intention of providing a general media file format for use with web applications and other online services. Other digital media formats are designed for different purposes. For example, the MPEG Transport Stream format, independent of the underlying codec, does not contain a seekable index (e.g., an index that supports seek functions). Such digital media formats do not natively support real-time streaming with seek functionality over the Internet. For these and other reasons, various digital media technologies suffer from various drawbacks and inefficiencies.

SUMMARY

Various aspects of the present technology relate to systems and methods to facilitate seek functionality in real-time streaming and playback of digital media. The present technology provides for generating an index for a digital media file encoded in a non-seekable format, determining a portion of the digital media file to transcode, and transcoding the portion of the digital media file to a proxy format based on the index.

According to another aspect of the present technology, generating the index for the digital media file comprises: performing a pass through the digital media file, and identifying during the pass through the digital media file, file offsets of key frames of the digital media file based on frame headers.

According to another aspect of the present technology, generating the index for the digital media file comprises: storing a file offset and a time offset for each key frame of the digital media file, wherein each file offset provides a respective location within the digital media file for each key frame, and wherein each time offset provides a respective time associated with each key frame.

According to another aspect of the present technology, determining the portion of the digital media file to transcode is based on a seek operation, and transcoding the portion of the digital media file comprises: determining a file offset corresponding to a time in the digital media file indicated by the seek operation based on the index, and transcoding the digital media file from the file offset.

According to another aspect of the present technology, determining the portion of the digital media file to transcode is based on a clip operation, and transcoding the portion of the digital media file comprises: determining a starting file offset corresponding to a start time in the digital media file indicated by the clip operation based on the index, determining an ending file offset corresponding to an end time in the digital media file indicated by the clip operation based on the index, and transcoding the digital media file from the starting file offset to the ending file offset.

According to another aspect of the present technology, determining the portion of the digital media file to transcode is based on a playback operation, and transcoding the portion of the digital media file comprises: determining a file offset corresponding to a beginning of the portion of the digital media file based on the index, and transcoding the portion of the digital media file from the file offset.

According to another aspect of the present technology, the present technology further provides for storing the transcoded portion of the digital media file, and providing the transcoded portion of the digital media file in response to a user request.

According to another aspect of the present technology, the present technology further provides for determining a first vector embedding based on a frame in the digital media file, determining a second vector embedding based on a search query, wherein determining the portion of the digital media file to transcode is based on the first vector embedding and the second vector embedding, and providing the transcoded portion of the digital media file in response to the search query.

According to another aspect of the present technology, the portion of the digital media file is transcoded without transcoding other portions of the digital media file.

According to another aspect of the present technology, the proxy format is a streaming format.

These and other objects, features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The figures depict various objects, features, and characteristics of the present technology for purposes of illustration. One skilled in the art will readily recognize from the following discussion that alternative structures and methods illustrated in the figures can be employed without departing from the principles of the present technology described herein.

DETAILED DESCRIPTION

The present technology relates to real-time streaming and playback of digital media. In general, various digital media formats do not natively support seek functionality in real-time streaming and playback. With such digital media formats, users generally cannot navigate (e.g., seek, clip) to a particular location in a file and must begin playback from the beginning of the file. One approach to providing the navigation operations to the file is to create a new proxy version of the file in a different format. This proxy version is typically created before the users try to access the file so that the proxy version is ready for streaming and playback. However, this approach is highly costly with regard to storage and computational effort as this approach requires duplication of files in different formats. Accordingly, the present technology addresses these and other drawbacks by providing various features for seek functionality in real-time streaming and playback of digital media files.

To facilitate these and other features, the present technology provides for preprocessing a media file to extract frame offset data (e.g., byte offset) from the media file for key frames in the media file. The frame offset data can be stored as index entries in an index that maps time offsets of the key frames to the frame offset data, or byte offset in the media file. The index can be stored in a database or as a separate file. As this preprocessing does not require decoding, encoding, or transcoding the media file, this preprocessing is less resource-intensive, and therefore less costly, than converting the media file into a proxy version. To facilitate streaming of the media file, the index can be retrieved and provided for efficient seek operations, clip operations, and playback operations. The media file can be transcoded in real-time to provide streaming and playback of the media file at particular locations in the media file in response to the seek operations, clip operations, and playback operations. Any transcoded portions of the media file can be stored and served again as appropriate. In this way, the cost of decoding, encoding, and transcoding is deferred until playback and applied to portions of the media file that are requested by the users. In various applications, such as media post-processing, only a portion of a media file may be played back. Therefore, the present technology provides for improvements in functionality and cost efficiency for real-time streaming and playback of digital media files.

Figure 1:
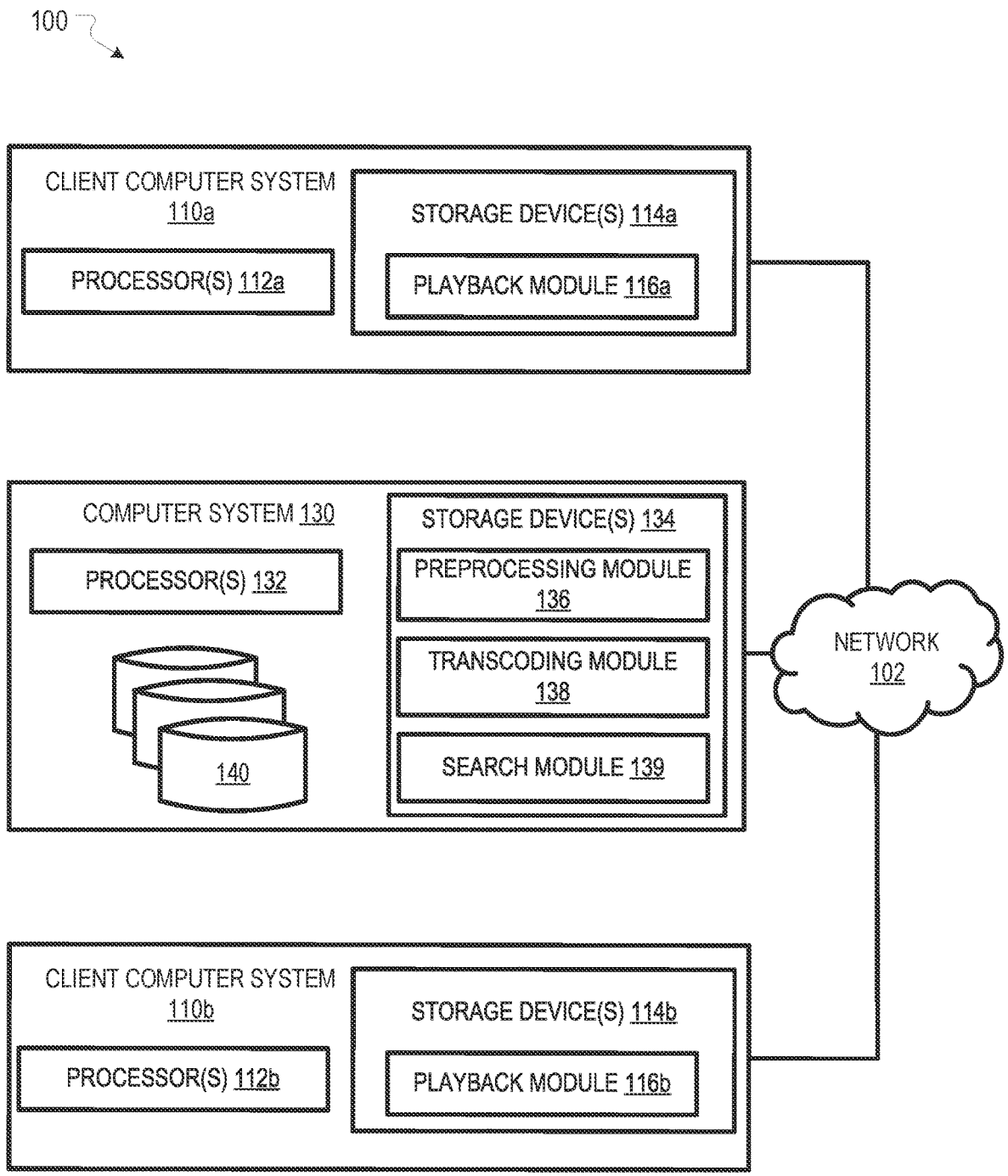
FIG. 1 illustrates an example system configured to facilitate real-time streaming and playback of digital media, in accordance with one or more implementations.

FIG. 1 illustrates an example system 100 configured to facilitate seek functionality in real-time streaming and playback of digital media, according to one or more implementation of the present technology. System 100 may include, without limitation, client computer systems 110a, 110b, a computer system 130, and/or other components. Various functionality described herein with respect to system 100 may be described as being performed by the client computer systems 110a, 110b, the computer system 130, and/or other components. In other implementations, some or all of the functionality described herein may be performed by any of the client computer systems 110a, 110b, the computer system 130, and/or other components.

In FIG. 1, in some implementations, client computer systems 110a, 110b, a computer system 130, and/or other components may be operatively linked via one or more electronic communication links. For example, such electronic communication links may be established, at least in part, via a network 102 such as the Internet, Bluetooth, and/or other networks. It will be appreciated that this is not intended to be limiting, and that the scope of this disclosure includes implementations in which client computer systems 110a, 110b, a computer system 130, and/or other components may be operatively linked via some other communication media.

Client computer systems 110a, 110b may include one or more processors 112a, 112b, one or more storage devices 114a, 114b, which can store playback modules 116a, 116b, and/or other components. Processors 112a, 112b may be programmed to perform various operations based on one or more computer program instructions. For example, processors 112a, 112b may be programmed to perform various operations by the playback module 116a, 116b and/or other instructions. Illustration of one or more processors 112a, 112b in FIG. 1 is not intended to be limiting. The one or more processors 112a, 112b may include a plurality of hardware, software, and/or firmware components operating together to provide the functionality attributed herein to one or more processors 112a, 112b. For example, one or more processors 112a, 112b may be implemented by a cloud of computing platforms operating together as one or more processors 112a, 112b.

One or more storage devices 114a, 114b may comprise non-transitory storage media that electronically stores information. The electronic storage media of one or more storage devices 114a, 114b may include one or both of system storage that is provided integrally (i.e., substantially non-removable) with one or more processors 112a, 112b and/or removable storage that is removably connectable to one or more processors 112a, 112b via, for example, a port (e.g., a USB port, a firewire port, etc.) or a drive (e.g., a disk drive, etc.). One or more storage devices 114a, 114b may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. One or more storage devices 114a, 114b may include one or more virtual storage resources (e.g., cloud storage, a virtual private network, and/or other virtual storage resources). One or more storage devices 114a, 114b may store software algorithms, information determined by one or more processors 112a, 112b, information received from computer system 130, and/or other information that enables client computer system 110a, 110b to function as described herein.

Playback module 116a, 116b can facilitate upload of media data, download (e.g., streaming) of media data, and playback of media data. The upload, download, and playback of the media data can be facilitated by an application, such as a web browser or a media streaming application. The media data may include, for example, video data and/or video files. The media data may be encoded with one of various codecs and stored in one of various file formats. For example, media data can be stored in an MPEG transport stream file, which does not contain a frame index. The client computer system 110a can upload the media data to computer system 130 through a media application on the client computer system 110a. The media data can be stored on the computer system 130, for example, in data store 140. Client computer system 110b can stream the media data uploaded by computer system 110a and playback the media data through a web browser.

Computer system 130 can include one or more processors 132, one or more storage devices 134, which can store a preprocessing module 136, a transcoding module 138, a search module 139, and/or other instructions, and/or other components. Processors 132 may be programmed to perform various operations based on one or more computer program instructions. For example, processors 132 may be programmed to perform various operations by the preprocessing module 136, the transcoding module 138, the search module 139, and/or other instructions. Illustration of one or more processors 132 in FIG. 1 is not intended to be limiting. The one or more processors 132 may include a plurality of hardware, software, and/or firmware components operating together to provide the functionality attributed herein to one or more processors 132. For example, one or more processors 132 may be implemented by a cloud of computing platforms operating together as one or more processors 132. One or more processors 132 may be configured to provide information processing capabilities in computer system 130. As such, one or more processors 132 may include one or more of a digital processor, an analog processor, a digital circuit designed to process information, an analog circuit designed to process information, a state machine, and/or other mechanisms for electronically processing information. Although one or more processors 132 is shown in FIG. 1 as a single entity, this is for illustrative purposes only. In some implementations, one or more processors 132 may include a plurality of processing units. These processing units may be physically located within the same device, or one or more processors 132 may represent processing functionality of a plurality of devices operating in coordination. One or more processors 132 may be configured to execute instructions provided by preprocessing module 136, transcoding module 138, search module 139, and/or other components. One or more processors 132 may be configured to execute instructions provided by preprocessing module 136, transcoding module 138, search module 139, and/or other components by software; hardware; firmware; some combination of software, hardware, and/or firmware; and/or other mechanisms for configuring processing capabilities on one or more processors 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although preprocessing module 136, transcoding module 138, and search module 139 are illustrated in FIG. 1 as being implemented within a single computer system 130, one or more of preprocessing module 136, transcoding module 138, and search module 139 may be implemented remotely. The description of the functionality provided by these modules is for illustrative purposes, and is not intended to be limiting, as any of preprocessing module 136, transcoding module 138, and search module 139 may provide more or less functionality than is described. For example, one or more of preprocessing module 136, transcoding module 138, and search module 139 may be eliminated, and some or all of its functionality may be provided by other ones of preprocessing module 136, transcoding module 138, and search module 139. As another example, one or more processors 132 may be configured to execute one or more additional components that may perform some or all of the functionality attributed below to one of preprocessing module 136, transcoding module 138, and search module 139.

One or more storage devices 134 may comprise non-transitory computer-readable storage media that electronically stores information. The non-transitory computer-readable storage media of the one or more storage devices 134 may include one or both of system storage that is provided integrally (i.e., substantially non-removable) with one or more processors 132 and/or removable storage that is removably connectable to one or more processors 132 via, for example, a port (e.g., a USB port, a firewire port, etc.) or a drive (e.g., a disk drive, etc.). One or more storage devices 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. One or more storage devices 134 may include one or more virtual storage resources (e.g., cloud storage, a virtual private network, and/or other virtual storage resources). One or more storage devices 134 may store software algorithms, information determined by one or more processors 132, information received from client computer system 110*a*, 110*b*, and/or other information that enables computer system 130 to function as described herein.

Preprocessing module 136 can facilitate preprocessing digital media to extract frame offset data from the digital media. Preprocessing the digital media can involve a pass (e.g., single pass) through a digital media file. During the pass, the digital media file is analyzed to identify frames without decoding the digital media in the digital media file. The frames can be identified based on frame headers, or other reference points, within the digital media file. For each identified frame, a file offset can be stored in an index (or index file) associated with the digital media file. The file offset can indicate where in the digital media file the identified frame is located. For example, the file offset can provide a number of bytes from the beginning of the digital media file to where the identified frame is located. For each identified frame, a time offset can be stored in the index associated with the digital media file. The time offset can indicate a time associated with when the identified frame is to be played back. For example, the time offset can provide a number of seconds from the beginning of the digital media to when the identified frame is to be played back. In some cases, a digital media file can include multiple tracks of digital media. In these cases, track information associated with each identified frame can be stored in the index to maintain the different tracks of digital media. The generated index can facilitate efficient seek operations, clip operations, and playback operations for the digital media file by providing a mapping of file offsets and time offsets for frames in the digital media file.

In some implementations, preprocessing the digital media file can involve extracting metadata from the digital media file. The metadata can include information associated with the digital media file, such as an author, a title, and a location associated with the digital media file. The metadata can facilitate search functionality for the digital media file. For example, a search for a particular author can return digital media files with metadata that include the particular author. In some implementations, preprocessing the digital media file can involve extracting thumbnail images from the digital media file. Extracting the thumbnail images can be performed in a second pass through the digital media file subsequent to a first pass to extract frame offset data from the digital media file. During the pass, frames in the digital media file can be sampled and thumbnail images can be extracted from the sampled frames. The extracted thumbnail images can be provided as previews when navigating to a particular location in the digital media file to facilitate efficient seeking or clipping during playback. For example, during a pass of a digital media file, frames in the digital media file can be sampled so that 50 thumbnail images are extracted during the pass. When the digital media file is provided for playback and a seek operation is performed on the digital media file, the 50 thumbnail images can provide previews of what the sampled frames display. In this way, a user is provided with a preview of various points in the digital media file, which helps to facilitate an efficient seek operation, clip operation, or playback operation.

As an example of the above, a video uploaded to the computer system 130 can be preprocessed to generate an index file for the video. In a pass through the video, video frame headers can be identified for the video. The video frames in the video can be identified using the video frame headers. For each video frame that is identified, a file offset and a time offset is stored in the index file. For example, the first frame of the video can have an entry corresponding to where the frame is in the file (e.g., X bytes from the beginning of the video file) and when the frame is played back during playback of the video (e.g., 0 seconds from the beginning of the video). In this way, the index file generated for the digital video file facilitates efficient seeking, clipping, and playback of the digital video file. For example, a user can begin playback of the video at a selected time (e.g., 3 minutes from the beginning of the digital video) and, based on the mapping provided by the index file, playback of the digital video can begin at a file offset corresponding with the selected time. Furthermore, the index file can be generated with more computational efficiency than transcoding the entire digital video file into a proxy format that supports seek operations and clip operations.

Transcoding module 138 can facilitate transcoding of digital media files. The transcoding module 138 can transcode a portion of the digital media file in response to a seek operation, a clip operation, or a playback operation. The portion of the digital media file that is transcoded can be determined based on an index associated with the digital media file. In response to a seek operation, the index associated with the digital media file can be used to identify a file offset corresponding to a time in the digital media file indicated by the seek operation. The digital media file can be transcoded from the identified file offset and provided for playback until playback of the digital media file stops (e.g., by a stop operation or by reaching the end of the digital media file). For example, a user can seek to a particular time (e.g., 3 minutes from the beginning) in a digital media file. Using the index associated with the digital media file, a file offset mapped to the particular time can be determined. The digital media file can be transcoded from the file offset and played back for the user. In response to a clip operation, the index associated with the digital media file can be used to identify a starting file offset corresponding with a start time of the clip and an ending file offset corresponding with an end time of the clip. The digital media file can be transcoded from the starting file offset to the ending file offset, generating a clip of the digital media file that has been transcoded (e.g., to a streaming format). For example, a user can clip a digital media file from a start time (e.g., 3 minutes from the beginning) to an end time (e.g., 5 minutes from the beginning). Using the index associated with the digital media file, a starting file offset mapped to the start time of the clip and an ending file offset mapped to the end time of the clip can be determined. The digital media file can be transcoded from the starting file offset to the ending file offset to generate a transcoded clip of the digital media file. In response to a playback operation, the digital media file can be transcoded from the beginning of the digital media file until the playback operation is stopped. The portions of the digital media file generated in these ways can be stored for future use. That is, in response to a seek operation, clip operation, or playback operation that involves a portion of a digital media file that was previously transcoded, the previously transcoded portion of the digital media file can be served again.

As an example of the above, a user can select a video to stream from the computer system 130. The video can be stored in a non-streaming format. The video can be transcoded starting from the beginning of the video and served to the user. To do so, an index file associated with the video can be used to determine a file offset of the first frame of the video. Transcoding and playback of the video can begin from the file offset corresponding to the first frame of the video. During playback of the video, the user can skip, or seek, to another point in the video (e.g., 30 minutes ahead into the video). The video can be transcoded starting from the seek point by using the index file to determine a file offset corresponding with the seek point. Transcoding and playback of the video can begin from the file offset corresponding to the seek point. When the user stops playback of the video, two transcoded portions of the video are generated and stored. The first portion can include transcoded video from the beginning of the video to where playback was stopped when the user performed the seek operation. The second portion can include transcoded video from the seek point to where playback was stopped by the user. The first portion and the second portion can be served to the user, or subsequent users, in response to requests that involves those portions of the video. As illustrated herein, the present technology serves media requested by a user without transcoding an entire digital media file, thereby improving computational efficiency and storage costs. These improvements are especially advantageous in situations where only a small portion of video material in a system is played over the lifetime of the system or when costs related to the system are based on use of the system rather than number of files managed within the system.

Search module 139 can facilitate searching of digital media files. In some implementations, searching digital media files can involve a text search for metadata extracted from the digital media files. During preprocessing of the digital media files, metadata containing information such as author, title, and location associated with the digital media files can be extracted. The search module 139 can receive a search query and provide digital media files with information matching the search query. For example, a user can search for videos by a particular author by entering a name of the particular author as a search query. Videos with metadata containing information that matches the name entered as the search query can be provided to the user as search results.

In some implementations, search module 139 can facilitate searching of digital media files based on semantic vector embeddings. In general, vector embeddings can be numerical representations (e.g., vectors) of various objects and concepts, such as those represented in images and text. Vector embeddings can be mapped to an embedding space and compared to determine relationships between the vector embeddings. The search module 139 can generate semantic vector embeddings for images (e.g., thumbnail images, key frames, frames) extracted from a digital media file. The images can be extracted during preprocessing of the digital media file. During preprocessing, frames in the digital media file can be sampled. The frames can be sampled, for example, at a predetermined rate (e.g., every 20 frames, every key frame), to meet a predetermined threshold (e.g., 50 frames, 50 key frames), or based on detected scene changes. The scene changes can be detected, for example, based on changes in pixel values (e.g., DCT DC coefficients) between frames that exceed a threshold pixel value. Images can be extracted from the sampled frames. Semantic vector embeddings can be generated based on the images. The semantic vector embeddings can represent objects or concepts depicted in the images. The semantic vector embeddings can be mapped to a vector embedding space with vector embeddings generated based on search queries. The semantic vector embeddings of the images can be evaluated with the vector embeddings of the search queries based on a cosine similarity. The semantic vector embeddings of the images that satisfy a threshold cosine similarity with a vector embedding of a search query can be determined to satisfy the search query. Clips or playback positions of the digital media file that correspond with the images of the semantic vector embeddings that satisfy the search query can be provided in response to the search query. For example, a video can be sampled at detected scene changes, and images can be extracted from the frames at the detected scene changes. Semantic vector embeddings can be generated based on the images. The semantic vector embeddings can be associated in an index file with file offsets and time offsets of the frames from which the semantic vector embeddings were generated. A user can search for videos depicting a particular object by entering words describing the object as a search query. A vector embedding can be generated based on the search query. The semantic vector embeddings can be evaluated with the vector embedding to determine which of the semantic vector embeddings satisfy the search query. Playback positions of the video associated with the semantic vector embeddings that satisfy the search query can be provided as search results.

Generation of semantic vector embeddings can utilize machine learning methodologies. For example, a machine learning model can be trained to generate semantic vector embeddings based on images extracted from frames of a digital media file. The machine learning model can be trained based on training data that includes instances of labelled images. An instance of training data can include an image and a corresponding label describing contents of the image. As part of the training of the machine learning model, a vector embedding can be generated based on the image. The vector embedding can be mapped to a vector embedding space with other vector embeddings. The machine learning model can be trained so that vector embeddings of images with the same or similar labels are mapped closer together than vector embeddings of images with dissimilar labels. Likewise, a machine learning model can be trained to generate vector embeddings based on text from search queries. The machine learning model can be trained based on training data that includes instances of search queries. As part of the training of the machine learning model, vector embeddings can be generated based on the text from the search queries. The machine learning model can be trained so that vector embeddings of text with the same or similar meanings are mapped closer together than vector embeddings of text with dissimilar meanings. These machine learning models can be trained to use the same vector embedding space so that vector embeddings of images and vector embeddings of text that represent the same or similar concepts are mapped closer together than vector embeddings of images and vector embeddings of text that represent dissimilar concepts.

Figure 2A:
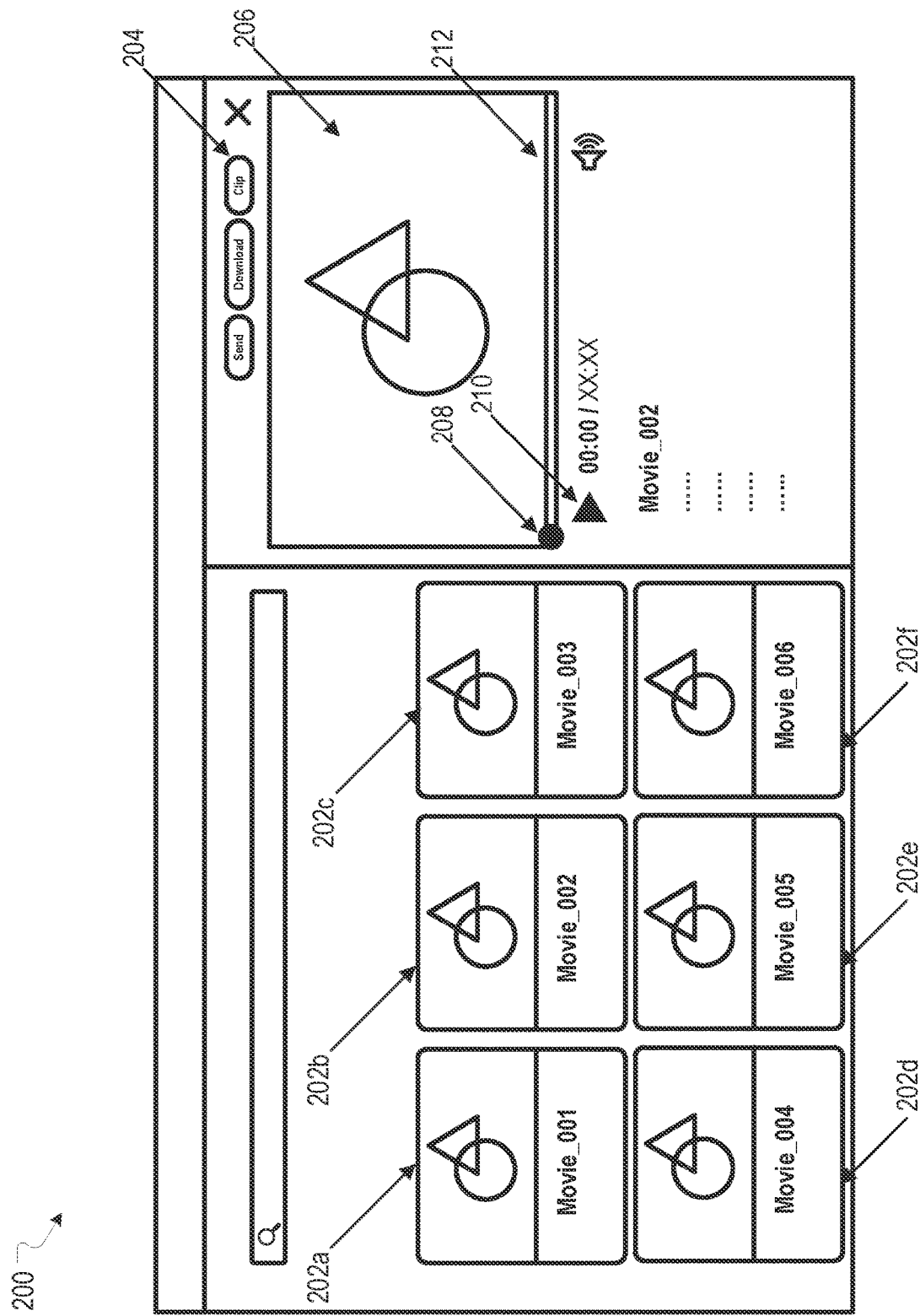
FIGS. 2A-2C illustrate example user interfaces related to real-time streaming and playback of digital media, in accordance with one or more implementations.
Figure 2B:
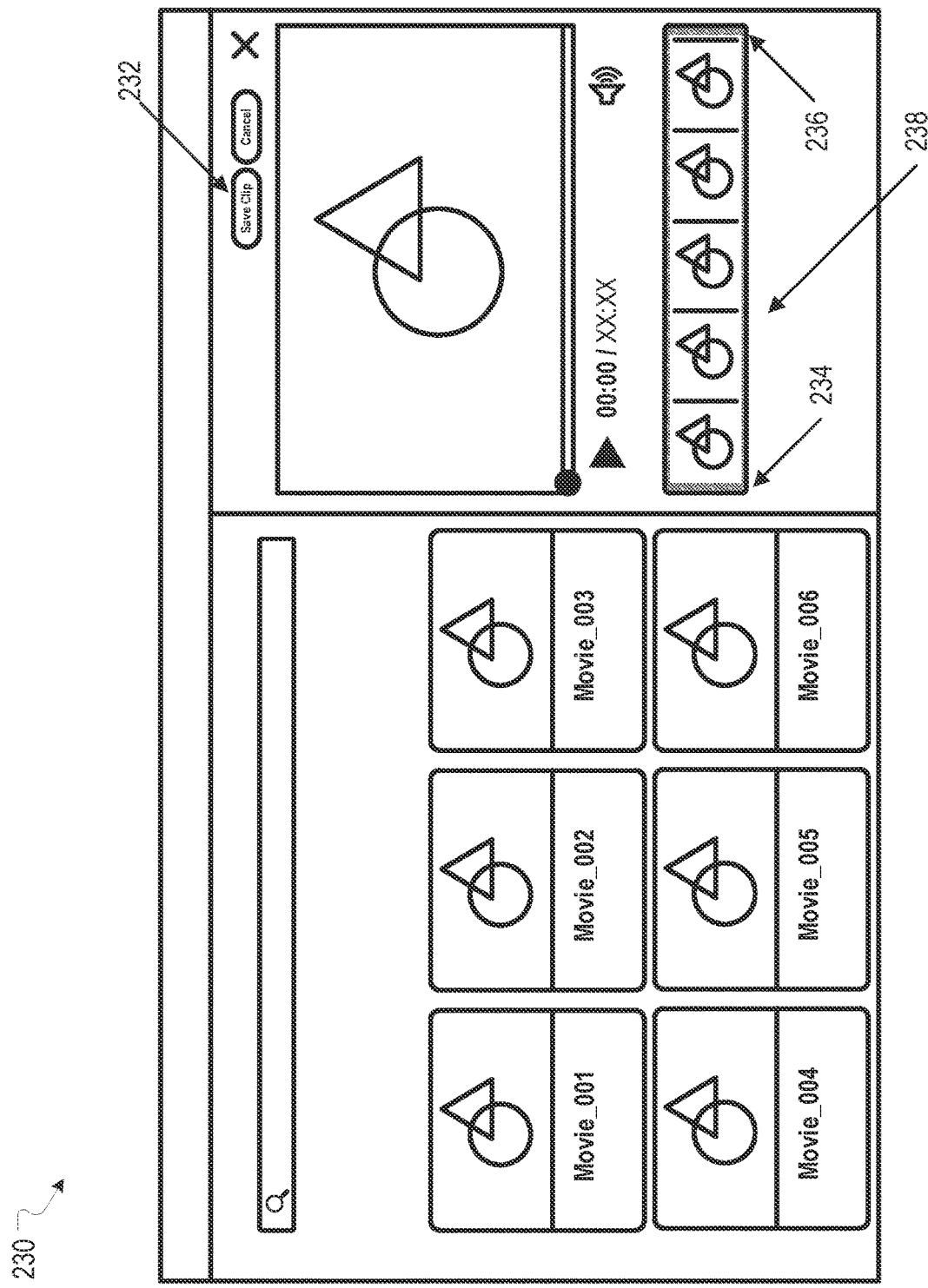
Figure 2C:
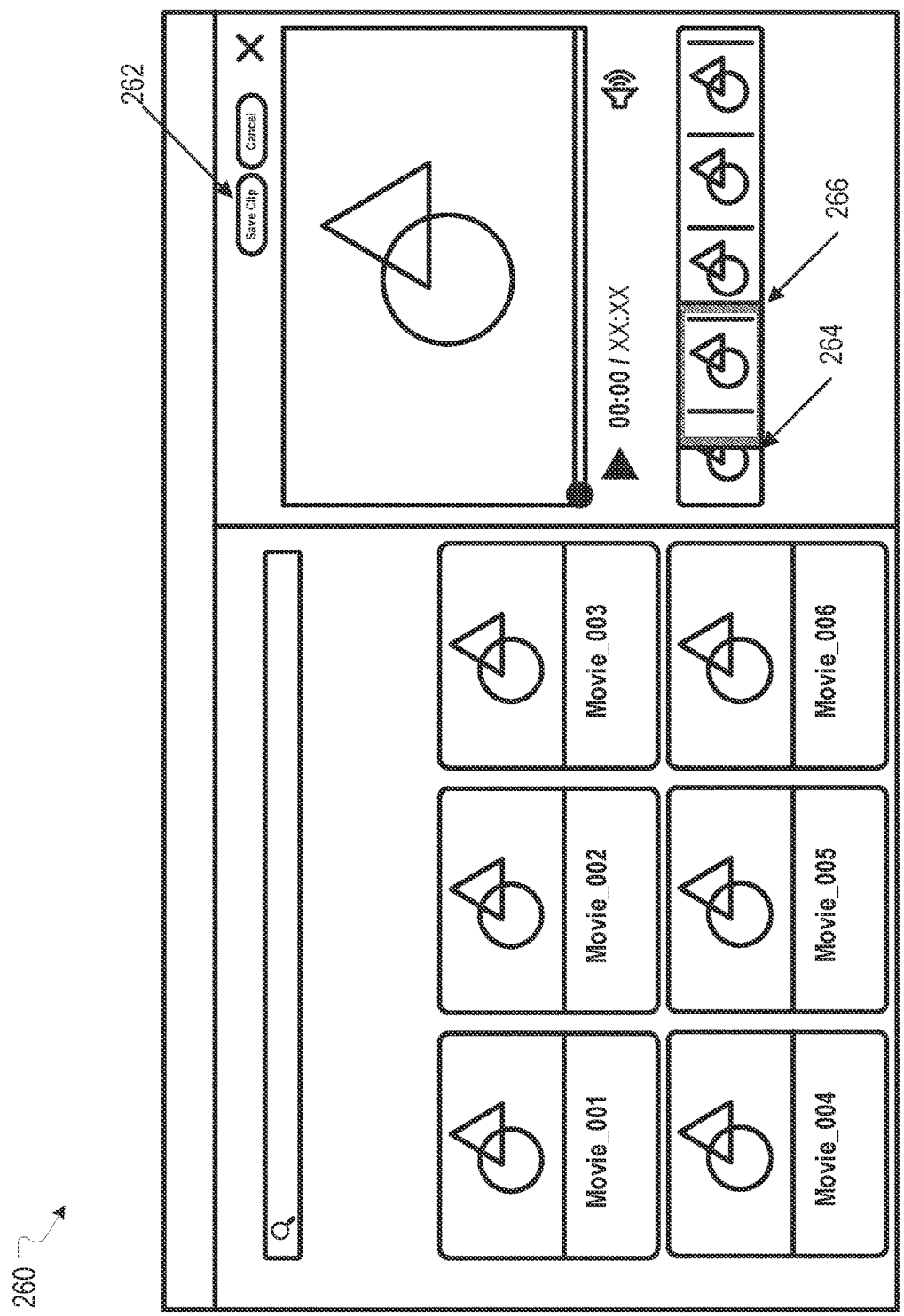

FIGS. 2A-2C illustrate example interfaces associated with seek operations, clip operations, and playback operations, according to some implementations of the present technology. The various functionality described herein can be performed by, for example, the system 100 of FIG. 1. It should be understood that there can be additional, fewer, or alternative functionality or steps performed in similar or alternative orders, or in parallel, based on the various features and embodiments discussed herein unless otherwise stated.

FIG. 2A illustrates an example interface 200 that can facilitate seek operations, clip operations, and playback operations. The example interface 200 displays videos 202a, 202b, 202c, 202d, 202e, 202f available for viewing. The videos 202a, 202b, 202c, 202d, 202e, 202f can include videos that are encoded in a non-streaming format (e.g., MPEG transport stream, Digital Nonlinear Extensible High Resolution/Definition (DNxHR/DNxHD)). As illustrated in FIG. 2A, video 202b ("Movie_002") is selected, and the example interface provides various options for operations available for video 202b. The example interface 200 includes a clip option 204 to perform a clip operation to generate a clip based on the selected video 202b. The example interface 200 includes a progress bar 212 and a seek pointer 208 to facilitate seek operations for the selected video 202b. For example, a user can drag the seek pointer 208 along the progress bar 212 to seek to a particular point in the selected video 202b. The example interface 200 includes a play button 210 to facilitate playback operations for the selected video 202b. For example, a user can select the play button 210 to begin playback of the selected video 202b from a particular point indicated by the seek pointer 208. In response to selection of the play button 210, the selected video 202b can be transcoded and provided for display in video window 206.

FIG. 2B illustrates an example interface 230 that can facilitate clip operations. The example interface 230 can, for example, be provided in response to a user selection of the clip option 204 in FIG. 2A. As illustrated in FIG. 2B, the example interface 230 includes a save clip option 232 to facilitate saving of a clip. For example, a user can select the save clip option 232 to generate a clip in a proxy format. The example interface 230 includes a preview bar 238 that includes thumbnail images of sampled frames. The example interface 230 includes a starting time indicator 234 and an ending time indicator 236 for selecting the start and the end of the clip. For example, a user can slide the starting time indicator 234 to a desired starting time for the clip and slide the ending time indicator 236 to a desired ending time for the clip. Selection of the save clip option 232 can generate a clip from the starting time indicated by the starting time indicator 234 to the ending time indicated by the ending time indicator 236.

FIG. 2C illustrates an example interface 260 that can facilitate clip operations. The example interface 260 can, for example, be provided in response to user interaction with the starting time indicator 234 and the ending time indicator 236 of FIG. 2B. As illustrated in FIG. 2C, the example interface 260 includes a starting time indicator 264 and an ending time indicator 266 for selecting the start and the end of the clip. As illustrated in this example, a user has slid the starting time indicator 264 from the start of the video to a desired starting time for the clip. Likewise, the user has slid the ending time indicator 236 from the end of the video to a desired ending time for the clip. Selection of the save clip option 262 can generate a clip from the starting time indicated by the starting time indicator 264 to the ending time indicated by the ending time indicator 266.

Figure 3A:
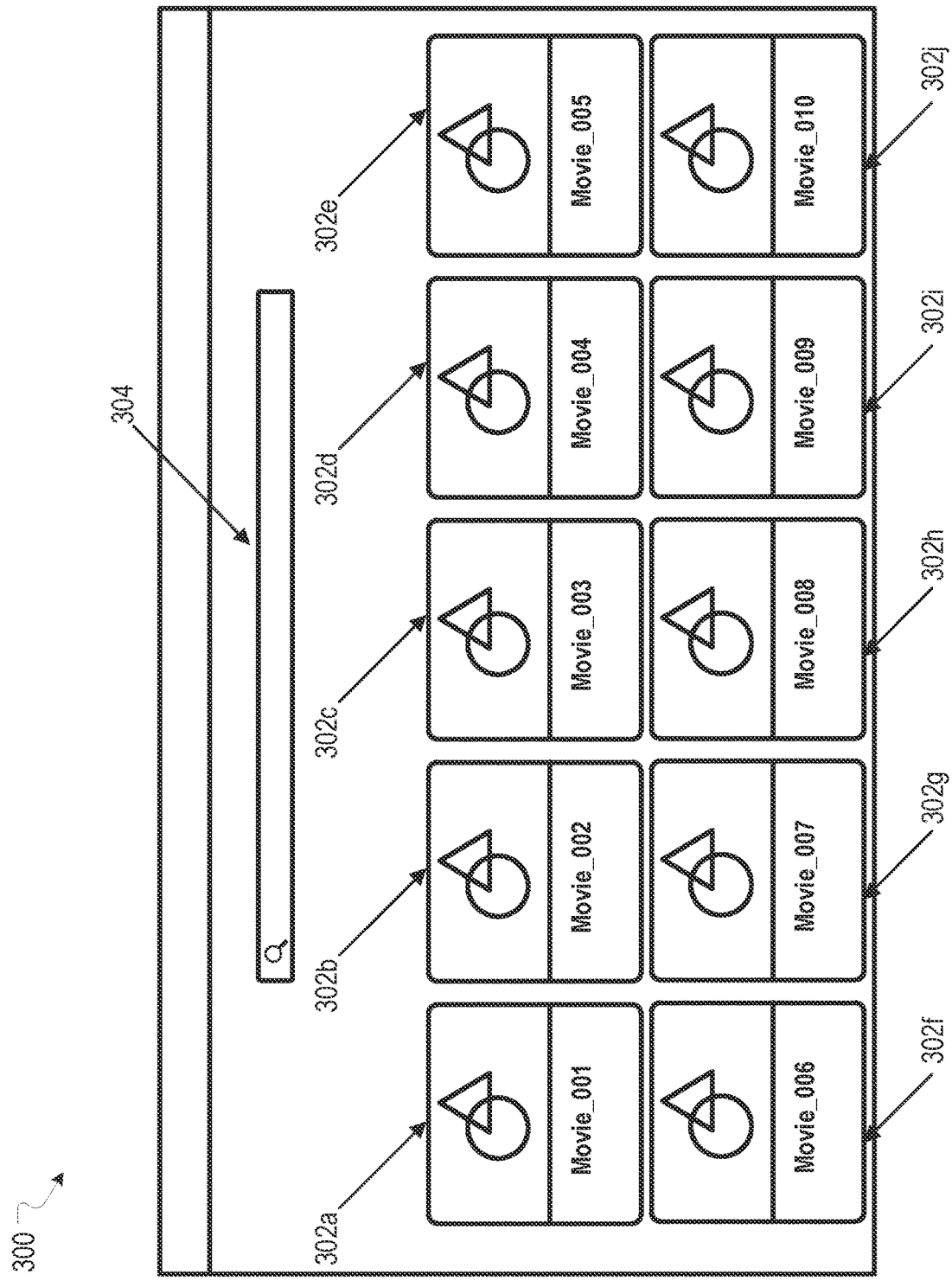
FIGS. 3A-3B illustrate example user interfaces related to real-time streaming and playback of digital media, in accordance with one or more implementations.
Figure 3B:
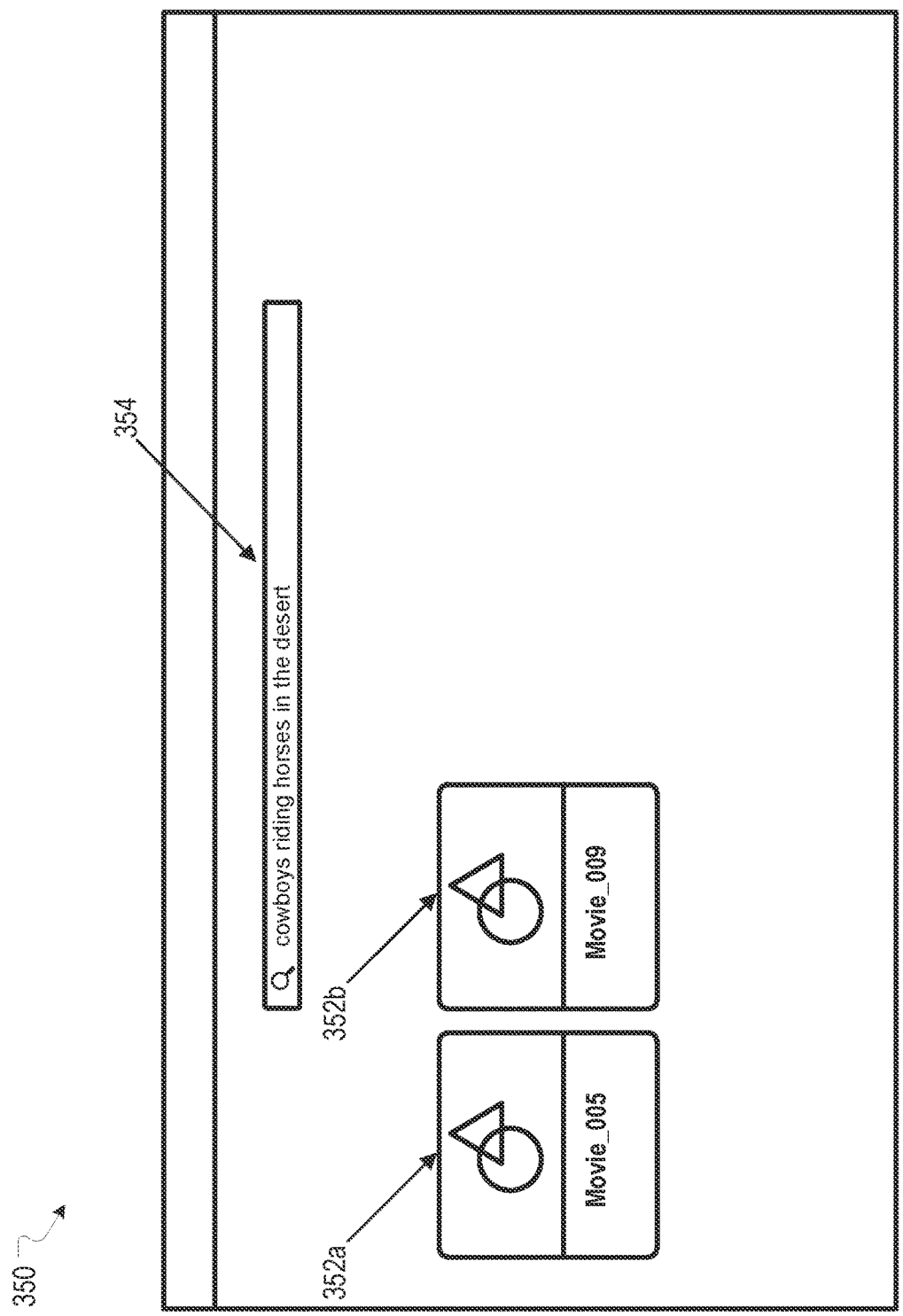

FIGS. 3A-3B illustrate example interfaces associated with search operations, according to some implementations of the present technology. The various functionality described herein can be performed by, for example, the system 100 of FIG. 1. It should be understood that there can be additional, fewer, or alternative functionality or steps performed in similar or alternative orders, or in parallel, based on the various features and embodiments discussed herein unless otherwise stated.

FIG. 3A illustrates an example interface 300 that can facilitate search operations. As illustrated in FIG. 3A, the example interface 300 displays videos 302a, 302b, 302c, 302d, 302e, 302f, 302g, 302h, 302i, 302j available for viewing. The example interface 300 provides a search bar 304 to facilitate search operations. For example, a user can enter a search query in the search bar 304 to perform a search operation based on the search query.

FIG. 3B illustrates an example interface 350 that can facilitate search operations. The example interface 350 can, for example, be provided in response to a user entering a search query in the search bar 304 of FIG. 3A. As illustrated in FIG. 3B, a user has entered a search term "cowboys riding horses in the desert" in the search bar 354. The example interface 350 displays videos 352a, 352b that satisfy the search term. Selection of the videos 352a, 352b can provide playback of the videos 352a, 352b from playback positions that satisfy the search term or provide playback of clips of the videos 352a, 352b that satisfy the search term. For example, in response to a user selection of video 352a, the user can be provided with playback of video 352a from a playback position in video 352a that depicts cowboys riding horses in the desert. Or, the user can be provided with a clip of video 352a that depicts cowboys riding horses in the desert.

Figure 4:
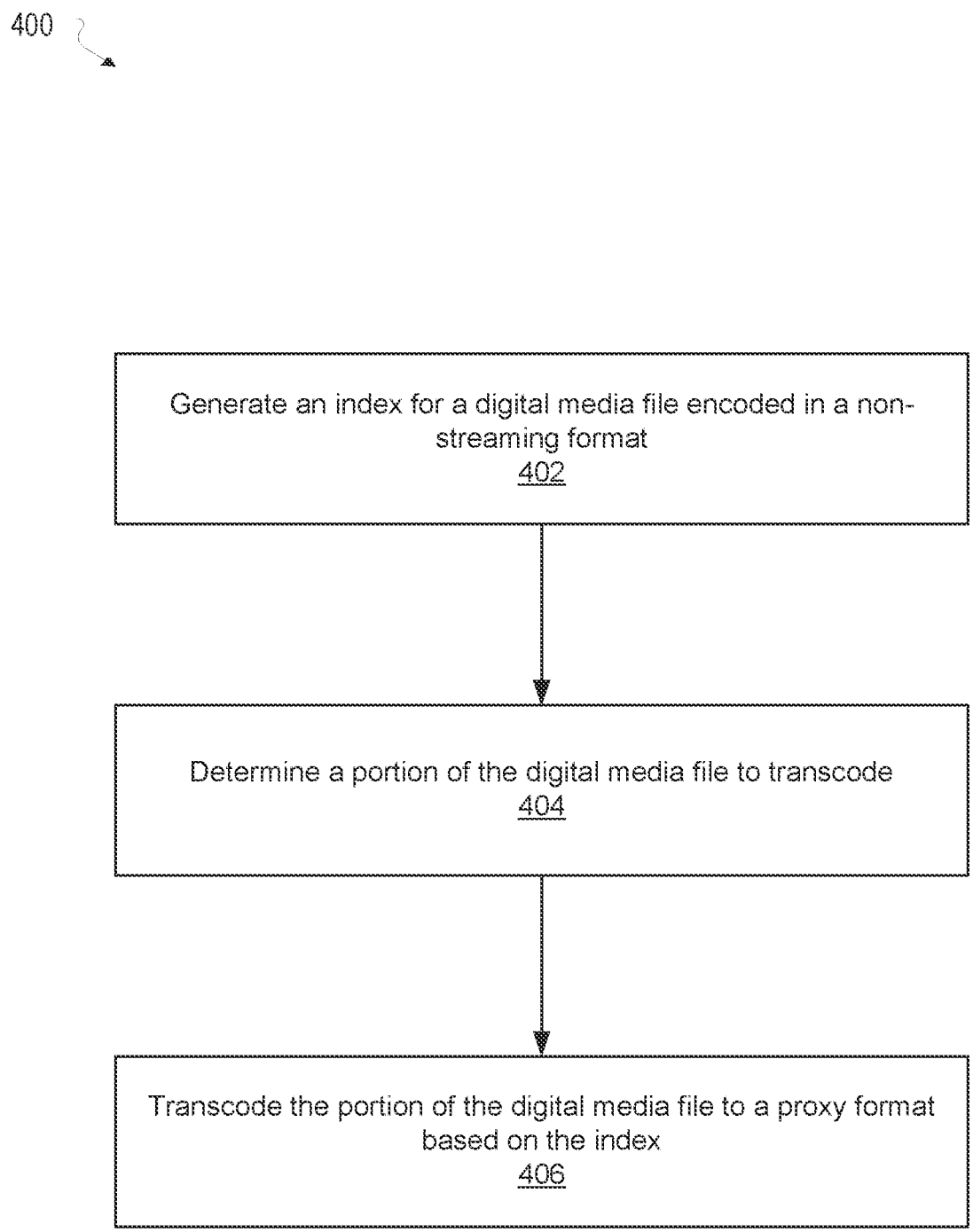
FIG. 4 illustrates an example method related to real-time streaming and playback of digital media, in accordance with one or more implementations.

FIG. 4 illustrates a method 400 to facilitate seek functionality in real-time streaming and playback of digital media, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400. Operations 402, 404, 406 may be performed by one or more hardware processors configured by machine-readable instructions including those shown in FIG. 1 and described herein.

An operation 402 can include generating an index for a digital media file encoded in a non-seekable format. In some cases, generating the index can involve, for example, performing a pass through the digital media file. File offsets of frames of the digital media file can be identified during the pass through the digital media file based on frame headers in the digital media file. In some cases, generating the index can involve storing a file offset and a time offset for each key frame of the digital media file. Each file offset provides a respective location within the digital media file for each key frame, and each time offset provides a respective time associated with each key frame.

An operation 404 can include determining a portion of the digital media file to transcode. In some cases, determining the portion of the digital media file can involve, for example, determining a file offset corresponding to a time in the digital media file indicated by a seek operation. The file offset can be determined based on an index. The digital media file can be transcoded from the file offset. In some cases, determining the portion of the digital media file can involve determining a starting file offset corresponding to a start time in the digital media file indicated by a clip operation. The starting file offset can be determined based on an index. An ending file offset corresponding to an end time in the digital media file indicated by the clip operation can be determined based on the index. The digital media file can be transcoded from the starting file offset to the ending file offset. In some cases, determining the portion of the digital media file can involve determining a file offset corresponding to a beginning of the portion of the digital media file. The file offset can be determined based on an index. The portion of the digital media file can be transcoded from the file offset.

An operation 406 can include transcoding the portion of the digital media file to a proxy format based on the index. For example, the portion of the digital media file can be transcoded to a streaming format with seek functionality provided in accordance with the features described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method comprising:
generating, by a computer system, an index for a digital media file encoded in a non-streaming and non-seekable format while identifying file offsets of key frames of the digital media file during a first pass through the digital media file, wherein generating the index for the digital media file comprises:
identifying, by the computer system, during the first pass through the digital media file, the file offsets of the key frames of the digital media file based on frame headers, and
storing, by the computer system, the file offset and a time offset for each key frame of the digital media file, wherein each file offset provides a respective location within the digital media file for each key frame, and wherein each time offset provides a respective time associated with each key frame;
determining, by the computer system, a portion of the digital media file to transcode; and
transcoding, by the computer system, the portion of the digital media file to a proxy format based on the index.

2. The method of claim 1, further comprising:
sampling, by the computing system, frames of the digital media file in a second pass through the digital media file; and extracting, by the computing system, images from the sampled frames of the digital media file.

3. The method of claim 1, wherein determining the portion of the digital media file to transcode is based on a seek operation, and wherein transcoding the portion of the digital media file comprises:
determining, by the computer system, a file offset corresponding to a time in the digital media file indicated by the seek operation based on the index; and
transcoding, by the computer system, the digital media file from the file offset.

4. The method of claim 1, wherein determining the portion of the digital media file to transcode is based on a clip operation, and wherein transcoding the portion of the digital media file comprises:
determining, by the computer system, a starting file offset corresponding to a start time in the digital media file indicated by the clip operation based on the index;
determining, by the computer system, an ending file offset corresponding to an end time in the digital media file indicated by the clip operation based on the index; and
transcoding, by the computer system, the digital media file from the starting file offset to the ending file offset.

5. The method of claim 1, wherein determining the portion of the digital media file to transcode is based on a playback operation, and wherein transcoding the portion of the digital media file comprises:
determining, by the computer system, a file offset corresponding to a beginning of the digital media file based on the index; and
transcoding, by the computer system, the digital media file from the file offset.

6. The method of claim 1, further comprising:
storing, by the computer system, the transcoded portion of the digital media file; and
providing, by the computer system, the transcoded portion of the digital media file in response to a user request.

7. The method of claim 1, further comprising:
determining, by the computer system, a first vector embedding based on a frame in the digital media file;
determining, by the computer system, a second vector embedding based on a search query, wherein determining the portion of the digital media file to transcode is based on the first vector embedding and the second vector embedding; and
providing, by the computer system, the transcoded portion of the digital media file in response to the search query.

8. The method of claim 1, further comprising:
extracting, by the computer system, images of the digital media file during a second pass through the digital media file based on detected scene changes; and
storing, by the computer system, vector embeddings generated based on the images in the index.

9. The method of claim 1, further comprising:
receiving, by the computer system, a search query for an object; and
determining, by the computer system, a playback position of the digital media file that satisfies the search query.

10. A system comprising:
one or more processors; and
one or more storage devices storing instructions that, when executed by the one or more processors, cause the system to perform:
generating an index for a digital media file encoded in a non-streaming and non-seekable format while identifying file offsets of key frames of the digital media file during a first pass through the digital media file, wherein generating the index for the digital media file comprises:
identifying during the first pass through the digital media file, the file offsets of the key frames of the digital media file based on frame headers, and
storing the file offset and a time offset for each key frame of the digital media file, wherein each file offset provides a respective location within the digital media file for each key frame, and wherein each time offset provides a respective time associated with each key frame;
determining a portion of the digital media file to transcode; and
transcoding the portion of the digital media file to a proxy format based on the index.

11. The system of claim 10, wherein the instructions further cause the system to perform:
sampling frames of the digital media file in a second pass through the digital media file; and
extracting images from the sampled frames of the digital media file.

12. The system of claim 10, wherein determining the portion of the digital media file to transcode is based on a seek operation, and wherein transcoding the portion of the digital media file comprises:
determining a file offset corresponding to a time in the digital media file indicated by the seek operation based on the index; and
transcoding the digital media file from the file offset.

13. The system of claim 10, wherein determining the portion of the digital media file to transcode is based on a clip operation, and wherein transcoding the portion of the digital media file comprises:
determining a starting file offset corresponding to a start time in the digital media file indicated by the clip operation based on the index;
determining an ending file offset corresponding to an end time in the digital media file indicated by the clip operation based on the index; and
transcoding the digital media file from the starting file offset to the ending file offset.

14. A non-transitory computer-readable storage medium including instructions that, when executed by one or more processors of a system, cause the system to perform:
generating an index for a digital media file encoded in a non-streaming and non-seekable format while identifying file offsets of key frames of the digital media file during a first pass through the digital media file, wherein generating the index for the digital media file comprises:
identifying, by the computer system, during the first pass through the digital media file, the file offsets of the key frames of the digital media file based on frame headers, and
storing, by the computer system, the file offset and a time offset for each key frame of the digital media file, wherein each file offset provides a respective location within the digital media file for each key frame, and wherein each time offset provides a respective time associated with each key frame;
determining a portion of the digital media file to transcode; and
transcoding the portion of the digital media file to a proxy format based on the index.

15. The non-transitory computer-readable storage medium of claim 14, wherein the instructions further cause the system to perform:

sampling frames of the digital media file in a second pass through the digital media file; and extracting images from the sampled frames of the digital media file.

16. The non-transitory computer-readable storage medium of claim 14, wherein determining the portion of the digital media file to transcode is based on a seek operation, and wherein transcoding the portion of the digital media file comprises:

determining a file offset corresponding to a time in the digital media file indicated by the seek operation based on the index; and transcoding the digital media file from the file offset.

17. The non-transitory computer-readable storage medium of claim 14, wherein determining the portion of the digital media file to transcode is based on a clip operation, and wherein transcoding the portion of the digital media file comprises:

determining a starting file offset corresponding to a start time in the digital media file indicated by the clip operation based on the index;

determining an ending file offset corresponding to an end time in the digital media file indicated by the clip operation based on the index; and transcoding the digital media file from the starting file offset to the ending file offset.

* * * * *